US012399949B2

(12) United States Patent
Chaibainou et al.

(10) Patent No.: US 12,399,949 B2
(45) Date of Patent: Aug. 26, 2025

(54) AUTOMATIC SNAPSHOT SELECTION AND ZONE CREATION

(71) Applicant: Content Square SAS, Paris (FR)

(72) Inventors: Charif Chaibainou, Paris (FR); Gregory Riberon, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/822,974

(22) Filed: Sep. 3, 2024

(65) Prior Publication Data
US 2025/0077608 A1 Mar. 6, 2025

Related U.S. Application Data

(60) Provisional application No. 63/580,310, filed on Sep. 1, 2023.

(51) Int. Cl.
*G06F 3/14* (2006.01)
*G06F 16/901* (2019.01)
*G06F 16/957* (2019.01)
*H04L 67/50* (2022.01)

(52) U.S. Cl.
CPC ...... *G06F 16/9577* (2019.01); *G06F 16/9027* (2019.01); *H04L 67/535* (2022.05)

(58) Field of Classification Search
CPC ................................................... G06F 16/9577
USPC ................................................. 715/234, 785
See application file for complete search history.

(56) References Cited

U.S. PATENT DOCUMENTS

| | | | | |
|---|---|---|---|---|
| 9,021,386 B1* | 4/2015 | Rasmussen | ........... | G06F 3/0485 |
| | | | | 715/785 |
| 2017/0285848 A1* | 10/2017 | Rosenberg | .......... | G06F 3/04883 |
| 2019/0171438 A1* | 6/2019 | Franchitti | ................ | G06N 3/08 |
| 2019/0339776 A1* | 11/2019 | Rosenberg | .............. | G06F 3/045 |
| 2021/0182166 A1* | 6/2021 | Hahn | .................. | G06F 11/3034 |
| 2021/0224864 A1* | 7/2021 | Royce | ..................... | G06F 16/22 |
| 2022/0043879 A1* | 2/2022 | Trigalo | ................ | G06F 40/166 |
| 2022/0391313 A1* | 12/2022 | Shang | ................. | G06F 11/3684 |

* cited by examiner

*Primary Examiner* — Ruay Ho
(74) *Attorney, Agent, or Firm* — Schwegman Lundberg & Woessner, P.A.

(57) ABSTRACT

Aspects of the present disclosure involve a system comprising a computer-readable storage medium storing a program and method for automatic snapshot selection and zone creation. The program and method provide for receiving, from a first device, an indication of user input selecting to determine zoning metrics for a webpage based on a selected device type; accessing plural session replays corresponding to different visitor sessions by at least one second device with respect to the webpage; selecting a session replay based at least in part on maximizing scroll amount associated with the session replay; selecting, from among plural available snapshots corresponding to the selected session replay, a snapshot based at least in part on minimizing display of additional elements on the webpage; automatically identifying, based on traversing a tree diagram corresponding to the selected snapshot, zones for webpage; and determining zoning metrics for display on the first device.

13 Claims, 8 Drawing Sheets

AUTOMATIC SNAPSHOT SELECTION AND ZONE CREATION

CLAIM OF PRIORITY

This Application claims the benefit of priority of U.S. Provisional Application No. 63/580,310, filed Sep. 1, 2023, which is hereby incorporated by reference in its entirety.

TECHNICAL FIELD

The present disclosure relates generally to web session analysis, including automatic snapshot selection and zone creation.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Web analysis solutions provide for the collection and analysis of website data. Example web analysis tools include the tracking and recording of session events corresponding to user interactions, automated website zone identification, session replay, statistical analysis of collected data, and the like.

The disclosed embodiments as described herein provide for an experience analytics system for automatic snapshot selection and zone creation. The experience analytics system receives a request (e.g., selection of a "one-click zoning" button) from a member client device to determine zoning metrics for a webpage based on a selected device type and/or time period. In response, the system accesses plural session replays corresponding to different visitor sessions by one or more customer client devices. The system selects, from among the plural session replays, a session replay based on maximizing scroll amount associated with the session replay. The system then selects, from among plural available snapshots corresponding to the selected session replay, a snapshot based on minimizing display of additional elements (e.g., a menu, a pop-up window, banner or some other element) on the webpage. The system automatically identifies, based on traversing a tree diagram corresponding to the selected snapshot, zones for webpage, and determines, based on automatically identifying the zones, zoning metrics for display on the first device.

By virtue of performing automatic snapshot selection and zone creation in this manner, the system provides for facilitated user engagement with respect to zoning. For example, the system reduces manual aspects (e.g., user input for snapshot selection, zone creation and the like) associated with conventional techniques for zone creation. It is therefore possible for the system to perform "one-click zoning." Thus, the system facilitates the creation of zones and the display of corresponding zone metrics, thereby saving time for end users, and reducing computational resources/processing power.

Networked Computing Environment

Figure 1:
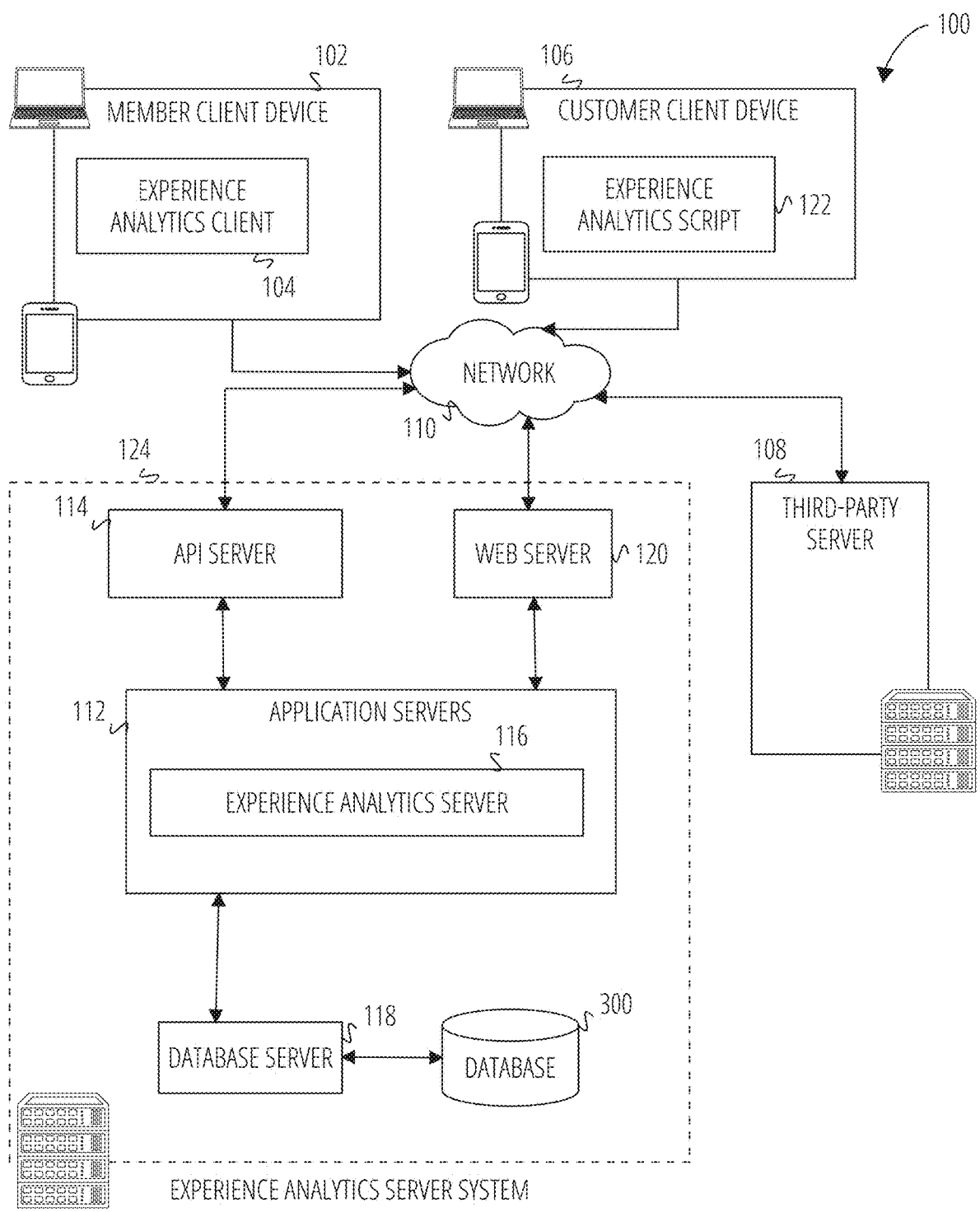
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
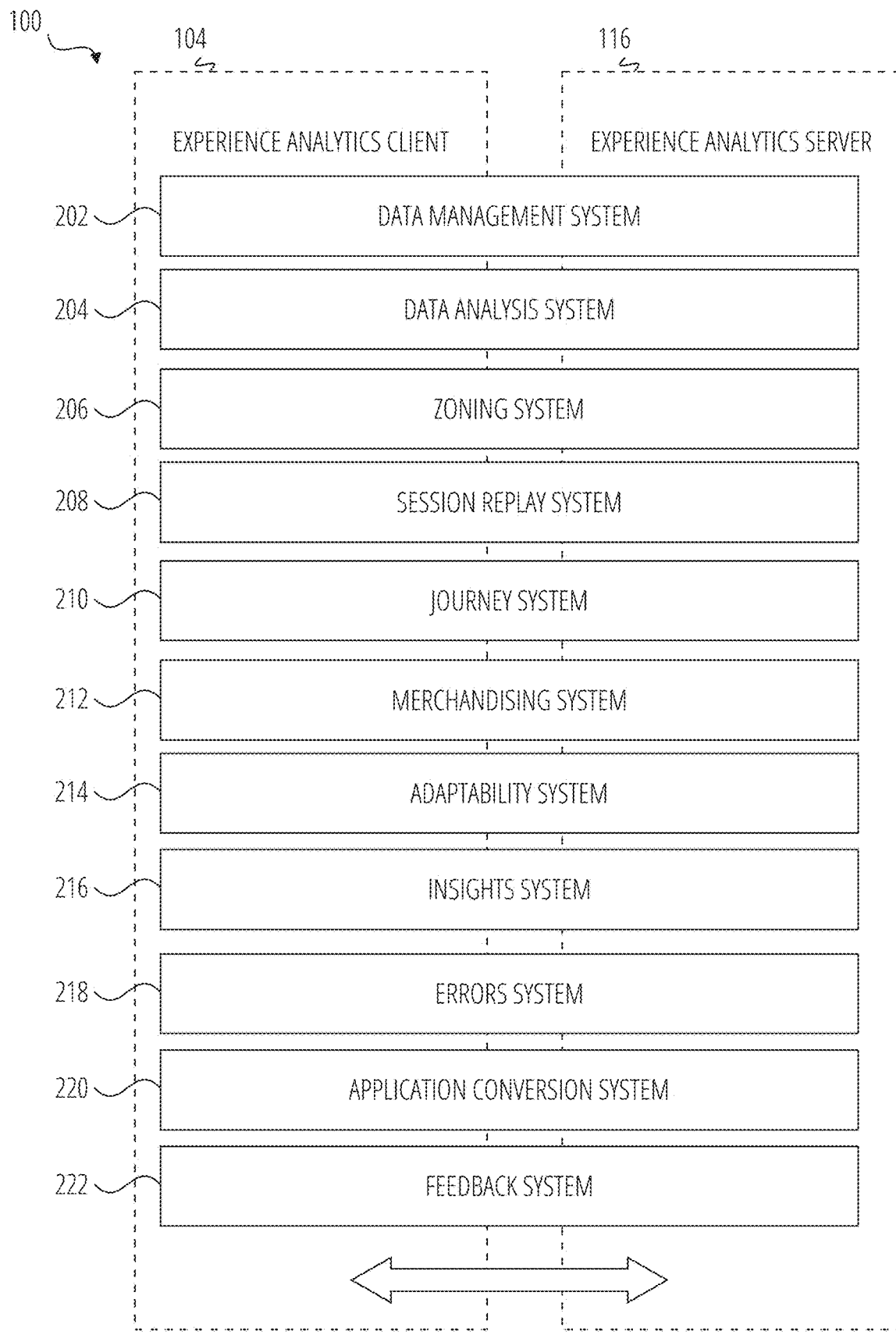
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

As discussed further below with respect to FIG. 6, the zoning system 206 may include an automatic snapshot selection module 614 and an automatic zone creation module 616. In response to a user request at the member client device 102 to perform one-click zoning, the automatic snapshot selection module 614 is configured to automatically select a snapshot (e.g., a preferred snapshot) from prior session replays, and the automatic zone creation module 616 is configured to automatically create zones based on the snapshot selected by the automatic snapshot selection module 614.

Data Architecture

Figure 3:
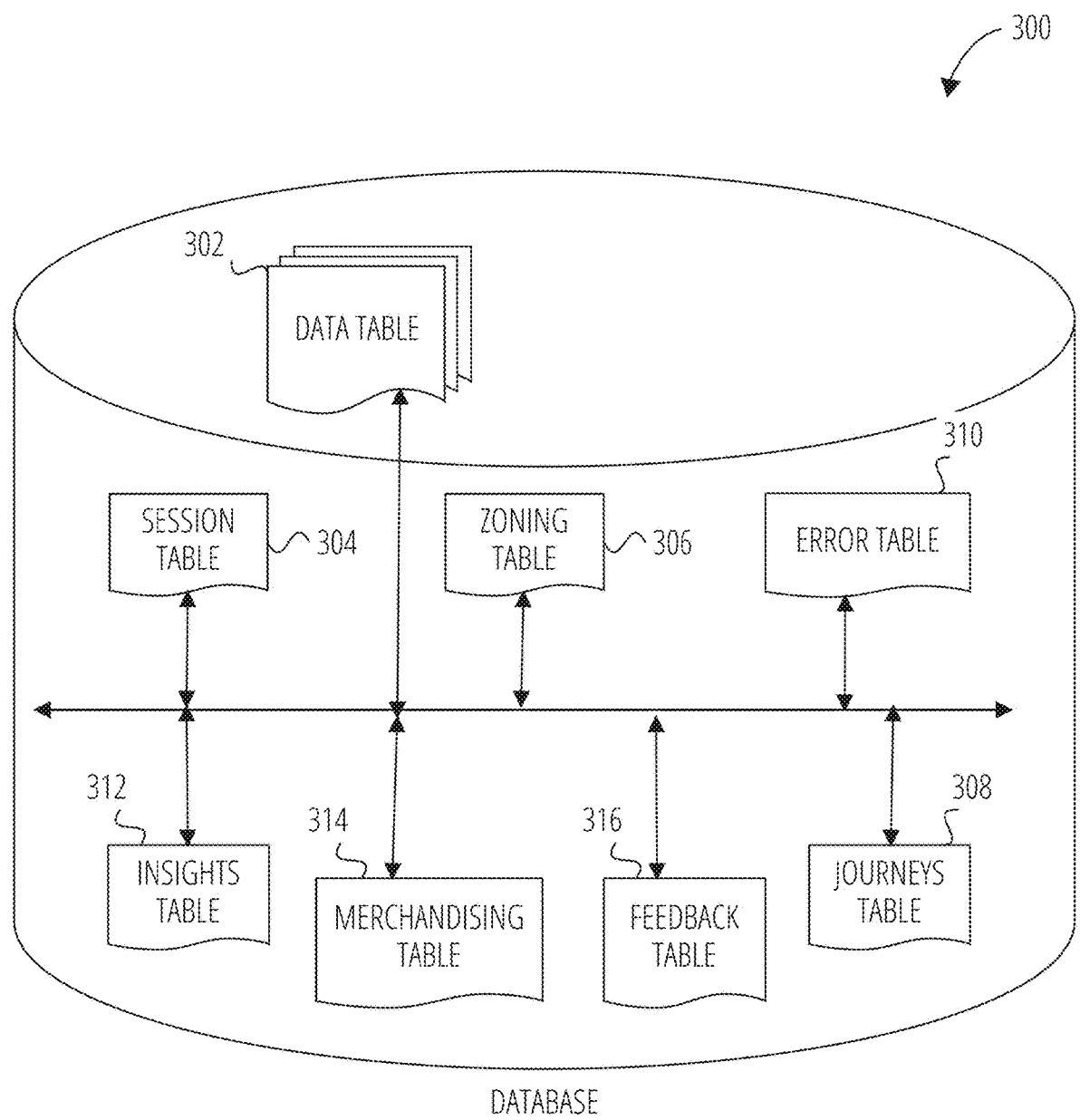
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

Figure 4:
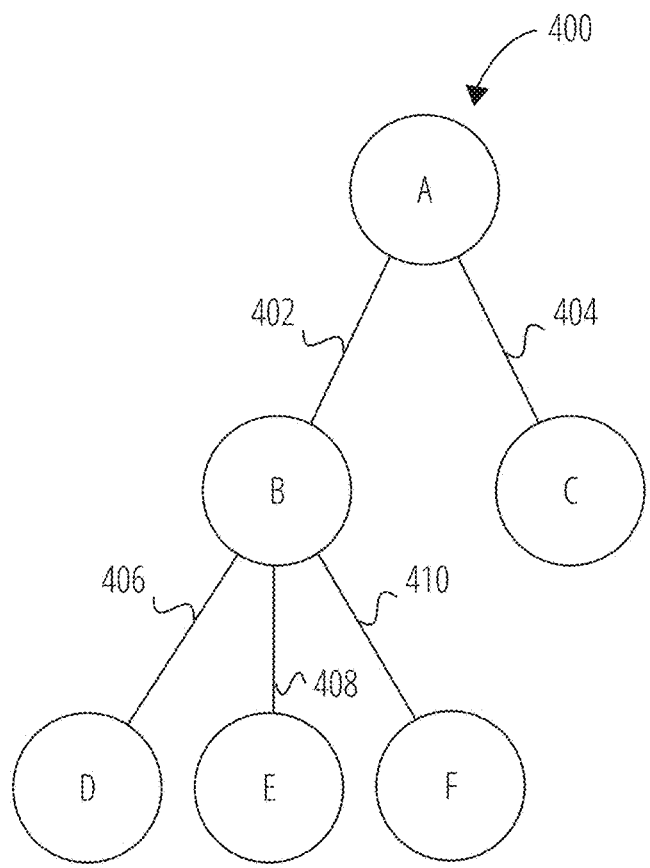
FIG. 4 illustrates an unlabeled document object model (DOM) tree, in accordance with some examples.

FIG. 4 illustrates an unlabeled document object model (DOM) tree 400, in accordance with some examples. In one or more embodiments, the unlabeled DOM tree 400 provides a visual representation of the hierarchical structure of a webpage's HTML code, with content zones or elements (e.g., as defined by the zoning system 206) represented as nodes A-F.

In the example unlabeled DOM tree 400, related nodes A-F are joined by links 402-410, representing the relationships between any two of the nodes A-F. In the example unlabeled DOM tree 400, a link 402 is established between nodes A and B, a link 404 is established between nodes A and C, a link 406 is established between nodes B and D, a link 408 is established between nodes B and E, and a link 410 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 5:
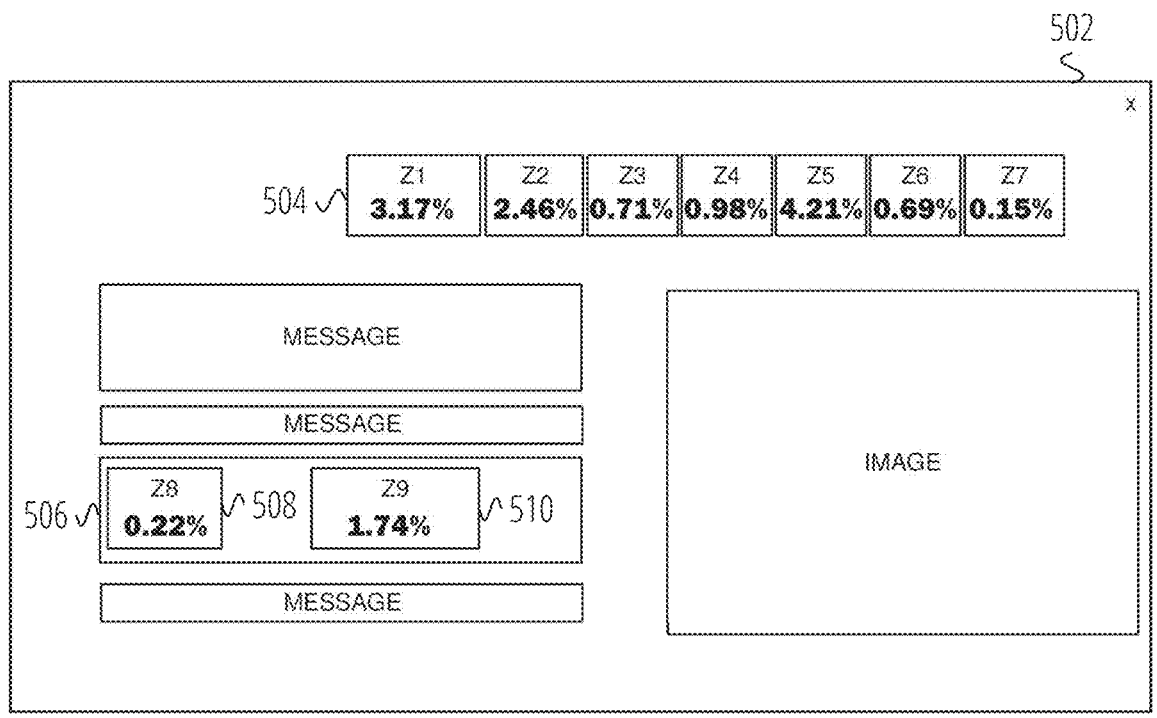
FIG. 5 is a user interface for presenting a webpage with performance information for zones in a webpage, in accordance with some examples.

FIG. 5 is a user interface 502 for presenting a webpage with performance information for zones in a webpage, in accordance with some examples. As described herein, a "zone" is a webpage feature or element included in the HTML and/or the corresponding DOM of the webpage. As noted above with respect to FIG. 4, a DOM node is a feature of the DOM, where the DOM node corresponds to a given HTML element or zone. Examples of zones in webpages include, but are not limited to, banner advertisements, product images, clickable buttons, and the like.

Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zone 504, 506, 508, 510), zoning metrics may be overlaid on the zones for ease of comparison between zones. The zoning metrics include hover rate, click recurrence, attractiveness rate, exposure rate, and exposure time, but other zoning metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone. The exposure rate is the percentage of page views where at least half of the zone was visible on the screen, and the exposure rate indicates how far the users are scrolling. Further, the exposure time is the average time with at least half of the zone is visible on the screen and indicates how long the zone is visible.

In the illustrated example in FIG. 5, the click recurrence for each zone is shown over imposed over the zone. For example, zone 504 shows that 3.17% of the users that view the zone click on the zone. Zones may also include other zones within, such as zone 506 that includes zone 508 (click recurrence of 0.22%) and zone 510 (click recurrence of 1.74%).

Regarding the exposure rate, in some example embodiments, the test of whether a user views the zone is that the user views at least a threshold portion of the zone. For example, viewing the zone may correspond with viewing the top half of the zone, corresponding to the vertical middle point of the zone is exposed to the user.

Figure 6:
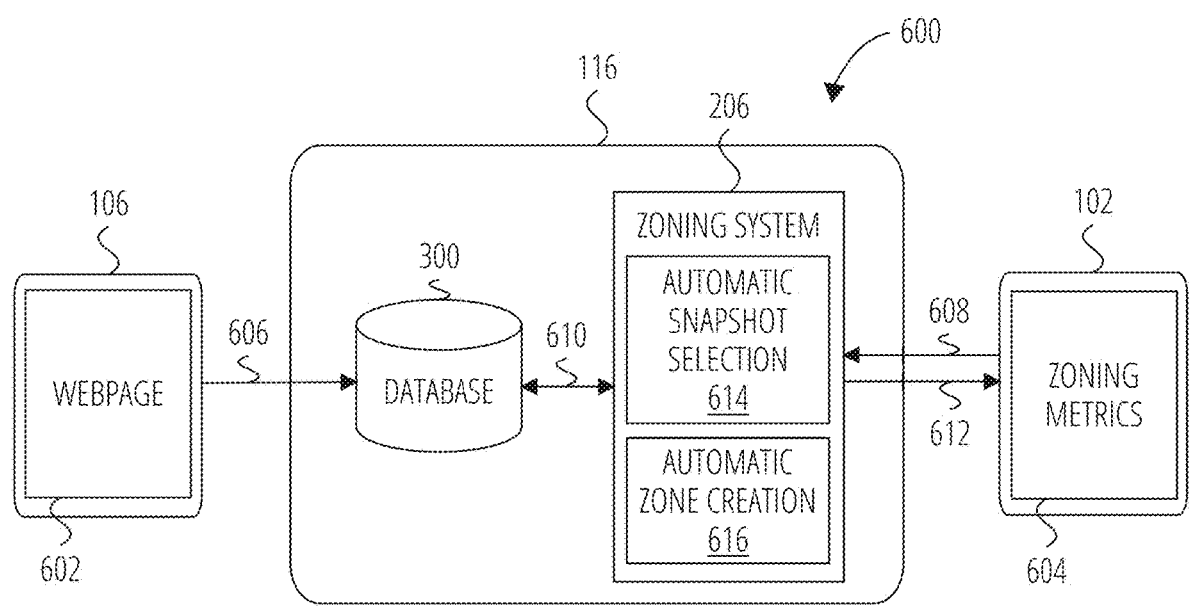
FIG. 6 illustrates an architecture for automatic snapshot selection and zone creation, in accordance with some examples.

FIG. 6 illustrates an architecture 600 for automatic snapshot selection and zone creation, in accordance with some examples. For explanatory purposes, the architecture 600 is primarily described herein with reference to the member client device 102, the customer client device 106 and the experience analytics server 116 of FIG. 1. However, the architecture 600 may correspond to one or more other components and/or other suitable devices.

In the example of FIG. 6, a user (e.g., customer) at the customer client device 106 accesses a website including a webpage 602. The user interacts with the webpage 602, with such interactions corresponding to session events performed with respect to the webpage 602. For example, the session events may include entering text in a text box, clicking a button with a mouse, tapping a button with a touchscreen, scrolling up or down on the webpage 602, hovering over a webpage element, and the like.

In one or more embodiments, the experience analytics script 122 of the customer client device 106 is configured to track the session events. For example, the experience analytics script 122 may be implemented in part as a tracking tag for the webpage 602, for tracking the session events within the webpage 602.

At operation 606, the customer client device 106 provides the session events to a pipeline, for example, in a serialized format. The experience analytics server 116 is configured to receive the serialized session events, and to store the session events in the database 300 (e.g., within the session table 304).

In the example of FIG. 6, operation 606 corresponds to a first phase which relates to storing session events (e.g., user interactions) for the webpage 602. Moreover, operations 608-612 correspond to a second phase which relates to presenting corresponding zoning metrics 604 (e.g., hover rate, click recurrence, attractiveness rate, exposure rate and/or exposure time for each zone) based on the session events of the webpage 602. It may be understood that the second phase may occur shortly after the first phase, or after an extended period of time after the first phase.

Regarding the second phase, a member user at the member client device 102 may request (e.g., via user input) to view the zoning metrics 604 for the webpage (e.g., as overlays on respective zones as shown in the example of FIG. 5). In example embodiments, the member client device 102 displays a user interface which allows the member user to select a webpage of the website (e.g., via a drop-down menu which lists the webpages of the website). Moreover, the member client device 102 displays a user interface with user-selectable elements to specify a time period for determining the zoning metrics 604. For example, the member client device 102 provides for the user to select a time period corresponding to one of: the last day, the last week, the last month, or a specified date range.

In addition, the member client device 102 displays a user interface which allows the member user to select a device type, including a single device (e.g., desktop, mobile or tablet) or a combination of devices (e.g., selected from desktop, mobile and/or tablet). For example, the user interface is a scrollable list from which the user can select the device type. In example embodiments, the user interface automatically defaults (e.g., preselects) the type of device used in the most recent zoning session (e.g., a device previously selected by a member client device 102 for zoning metrics).

The member client device 102 further includes a user-selectable button to perform "one-click zoning" based on an identified webpage, the selected device type and/or selected time period (e.g., one or more of which may correspond to default values). As described herein, one-click zoning provides for the zoning system 206 to (a) automatically select a snapshot, from among available snapshots corresponding to a selected session replay stored in the database 300, and (b) automatically create zones and zoning metrics based on the selected snapshot. As noted above, a session replay corresponds replaying a prior visitor session for a period of time, and is based on accessing session events stored in the database 300.

Thus, the member client device 102 provides a one-click zoning request (e.g., which identifies a webpage, a selected device type and/or a selected time period) to the experience analytics server 116 for the zoning metrics 604 (operation 608). In response to the receiving the request, the zoning system 206 of the experience analytics server 116 accesses the session replays stored in the database 300 (operation 610).

As noted above, the database 300 stores serialized session events. The experience analytics server 116 is configured to unserialize the session events in order to generate the session replays, and to select a suitable session replay from the available session replays. From among the available snapshots in a selected session replay, the automatic snapshot selection module 614 provides for automatically selecting a snapshot (e.g., a preferred snapshot) from which to determine/create zones and to display zoning metrics.

In example embodiments, the automatic snapshot selection module 614 is configured to select a fitting/suitable session replay using multiple requests: attempting to select a session replay with the most (e.g., maximum) scroll that fits the analysis context. For example, the analysis context may relate to one or more of: date range, device, and/or user segment.

If none of the initial session replays fit the analysis context, the automatic snapshot selection module 614 is configured to expand the scroll range (e.g., going down to a predefined percentage, such as 70% scroll) and/or to expand the time period (e.g., expanding a predefined amount beyond the previously-selected last day, week, month, or specified date range), in order to make more session replays available for selection. In this manner, the automatic snapshot selection module 614 may perform up to three different requests.

After selecting a session replay, the automatic snapshot selection module 614 is configured to identify a preferred (e.g., ideal) moment of the user session to capture the snapshot (e.g., by prioritizing "recording events") within the session replay. In example embodiments, the automatic snapshot selection module 614 attempts to select a moment right before user actions that may change the website layout (e.g., a click). For example, it may be undesirable to select a snapshot in which an additional element (e.g., a menu, a pop-up window, banner or some other element) is displayed. When the automatic snapshot selection module 614 detects such an event, the automatic snapshot selection module 614 is configured to capture a snapshot right before it. In a case where such an event is not detected, the automatic snapshot selection module 614 is configured to check the scroll (e.g., with a goal to have a snapshot with as much/maximum scroll as possible), with a goal to make sure all resources, such as images, are loaded when capturing the snapshot.

In example embodiments, in response to a user selection to change the device type, the member client device 102 is configured to update the snapshot to correspond to the newly-selected device. In this regard, the member client device 102 in conjunction with the automatic snapshot selection module 614 is configured to store/save snapshots (e.g., in the database 300 within a snapshots data structure of the zoning table 306 or the session table 304) in association with each device type. In a case where a snapshot was not previously stored, the automatic snapshot selection module 614 is configured to create a new snapshot for the matching device type (e.g., and/or user-selected webpage and time period).

Moreover, as part of the one-click zoning, the automatic zone creation module 616 is configured to automatically create zones based on the current snapshot selected by the automatic snapshot selection module 614. As noted above, a "zone" is a webpage feature or element included in the HTML and/or the corresponding DOM of the webpage 602.

In example embodiments, the automatic zone creation module 616 is configured to traverse the HTML tree (e.g., the DOM tree), and to determine a target for webpage nodes. As described herein, a "target" refers to an identifier computed for a webpage node, such as an HTML node, or corresponding DOM node. Each target may be represented as a target path. Moreover, target values may be variously-computed based on various webpage properties including, without limitation, tag names, element classes, element order in the DOM, specific attributes, and the like, as well as any combination thereof.

Thus, at each level of the DOM tree, the automatic zone creation module 616 checks the target paths of the zones. In doing so, the automatic zone creation module 616 compares the area of the zone to the surface area of the snapshot. If the area of the zones take less than a threshold percentage (e.g., 10%) of the surface area of the snapshot, the automatic zone creation module 616 stops there and selects these as zones with respect to the snapshot. If the area of the zones are greater or equal to the threshold percentage (e.g., 10%), the automatic zone creation module 616 traverses down to the children zones (one level below in the DOM), and re-performs (e.g., rechecks) the prior step (e.g., threshold percentage of surface area). This is repeated for nested children zones until reaching below the threshold percentage. In this manner, it is possible for the automatic zone creation module 616 to create more meaningful zones. For example, the automatic zone creation module 616 prioritizes the surface area that these zones occupy within the snapshot (e.g., with 10% being an arbitrary threshold percentage).

In example embodiments, after automatic creation of the zones, the experience analytics server 116 in conjunction with the zoning system 206 is further configured to determine zoning metrics 604 for the created zones of the webpage 602. For each target, the zoning system 206 is configured to determine respective zoning metrics 604 for that target. After determining zoning metrics 604, the zoning system 206 sends an indication of the zoning metrics 604 to the member client device 102 (operation 612). In response, the member client device 102 provides for display of the created zones and zoning metrics 604. For example, the zoning metrics 604 are presented as overlays with respect to a representation of the webpage 602 displayed on the member client device 102.

While the example of FIG. 6 is depicted as a single customer client device 106, it is possible that the experience analytics server 116 provides for aggregating session replays (e.g., based on serialized session events) from multiple customer client devices 106 (e.g., based on device type). The aggregated data is stored in the database 300, and is usable by the zoning system 206 to present zoning metrics 604 with respect to the plural customer client devices 106.

Thus, the experience analytics system 100 as described herein provides for automatic snapshot selection and zone creation. The experience analytics server 116 receives a request (e.g., selection of a "one-click zoning" button) from a member client device 102 to determine zoning metrics for an identified webpage 602 based on a selected device type and/or time period. In response, the experience analytics server 116 accesses plural session replays corresponding to different visitor sessions by one or more customer client devices 106. The experience analytics server 116 selects, from among the plural session replays, a session replay based on maximizing scroll amount associated with the session replay. The experience analytics server 116 then selects, from among plural available snapshots corresponding to the selected session replay, a snapshot based on minimizing display of additional elements (e.g., a menu, a pop-up window, banner or some other element) on the webpage. The experience analytics server 116 automatically identifies, based on traversing a tree diagram corresponding to the selected snapshot, zones for webpage, and determines, based on automatically identifying the zones, zoning metrics for display on the first device.

By virtue of performing automatic snapshot selection and zone creation in this manner, the experience analytics system 100 provides for increased user and facilitated engagement with respect to zoning. For example, the experience analytics system 100 system reduces manual aspects (e.g., user input for snapshot selection, zone creation and the like) associated with conventional techniques for zone creation. It is therefore possible for the experience analytics system 100 to perform "one-click zoning." Thus, the system facilitates the creation of zones and the display of corresponding zone metrics, thereby saving time for end users, and reducing computational resources/processing power.

Figure 7:
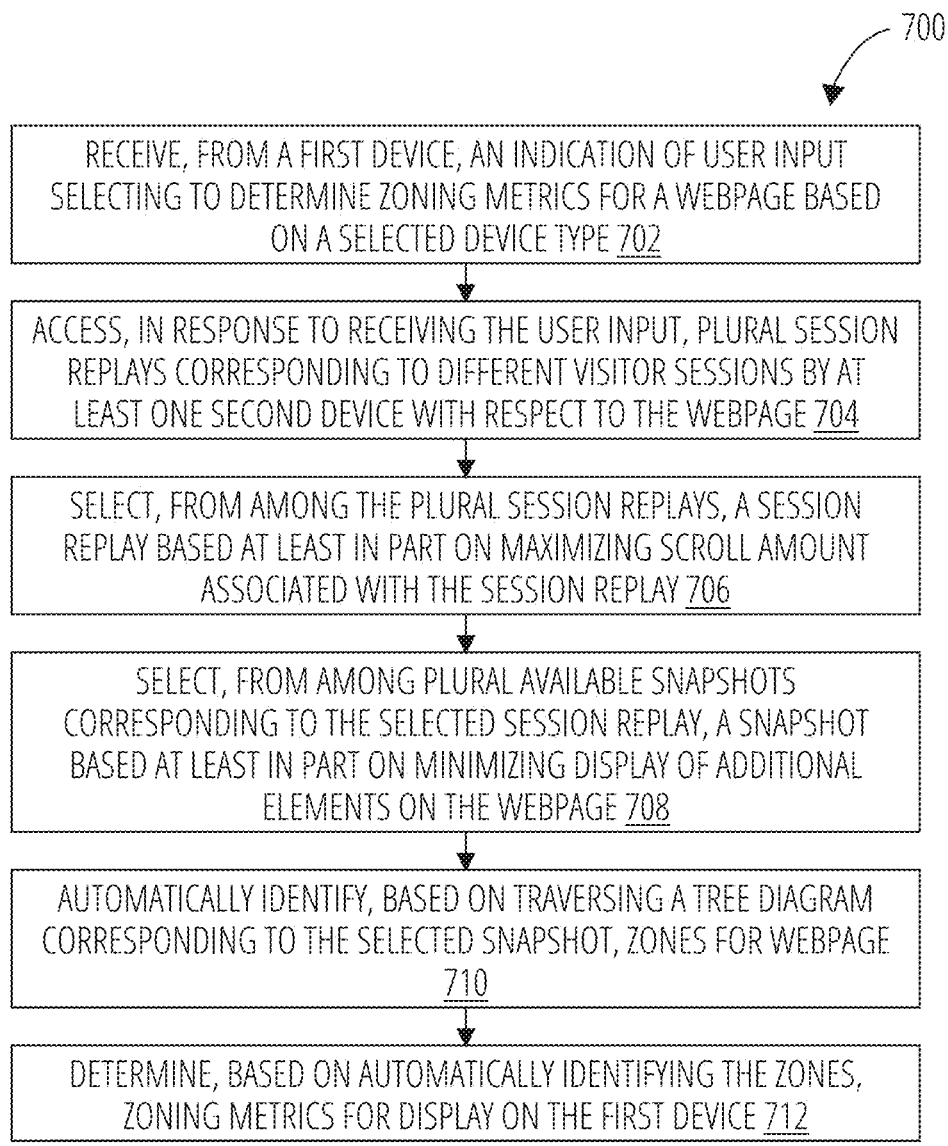
FIG. 7 is a flowchart illustrating a process for automatic snapshot selection and zone creation, in accordance with some examples.

FIG. 7 is a flowchart illustrating a process 700 for automatic snapshot selection and zone creation, in accordance with some examples. For explanatory purposes, the process 700 is primarily described herein with reference to the member client device 102, the customer client device 106 and the experience analytics server 116 of FIG. 1. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

The experience analytics server 116 receives, from the member client device 102, an indication of user input selecting to determine zoning metrics for a webpage based on a selected device type (block 702). In example embodiments, determining the zoning metrics is performed in association with an analysis context for the webpage.

The experience analytics server 116 accesses, in response to receiving the user input, plural session replays corresponding to different visitor sessions by at least one customer client device 106 with respect to the webpage (704). The experience analytics server 116 selects, from among the plural session replays, a session replay based at least in part on maximizing scroll amount associated with the session replay (block 706). In example embodiments, selecting the session replay is further based on the selected device type.

In example embodiments, the experience analytics server 116 determines that an initial subset of the plural session replays does not include a session replay that matches the analysis context for the webpage based on maximizing the scroll amount, expands, based on the determining, a scroll range for the plural session replays beyond the initial subset, and selects the session replay based on the expanded scroll range. Alternatively or in addition, the experience analytics server 116 determines that an initial subset of the plural session replays does not include a session replay that matches the analysis context for the webpage based on maximizing the scroll amount, expands, based on the determining, a time period range for the plural session replays beyond the initial subset, and selects the session replay based on the expanded time period range.

The experience analytics server 116 selects, from among plural available snapshots corresponding to the selected session replay, a snapshot based at least in part on minimizing display of additional elements on the webpage (block 708). For example, the additional elements on the webpage comprise at least one of a menu or a pop-up element.

In example embodiments, selecting the snapshot is further based on maximizing scroll amount associated with the snapshot. Alternatively or in addition, selecting the snapshot is further based on determining that all resources are loaded with respect to the snapshot.

The experience analytics server 116 automatically identifies, based on traversing a tree diagram corresponding to the selected snapshot, zones for webpage (block 710). The experience analytics server 116 determines, based on automatically identifying the zones, zoning metrics for display on the member client device 102 (block 712).

Machine Architecture

Figure 8:
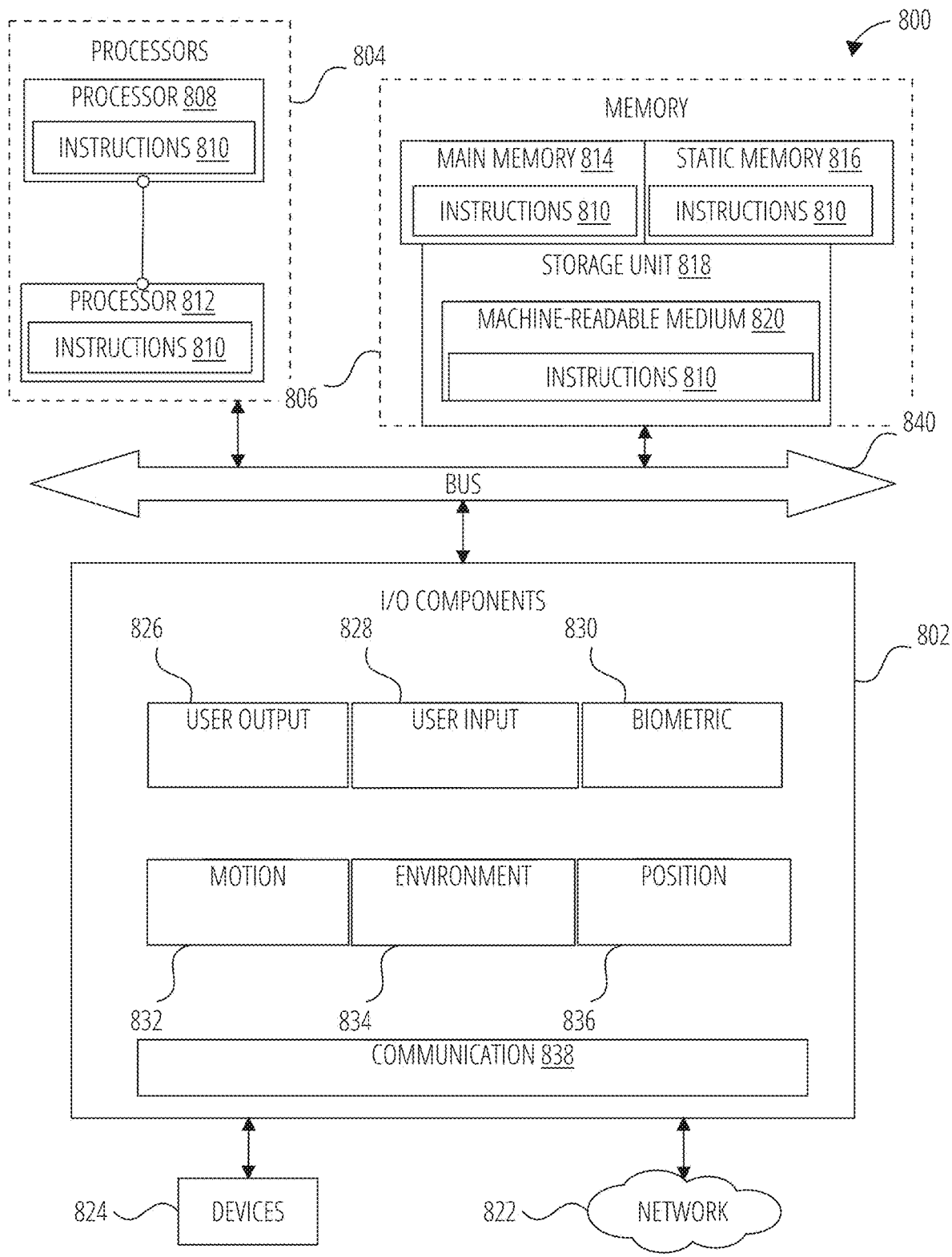
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an application, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the member client device 102 or any one of a number of server devices forming part of the experience analytics server 116. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 814, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
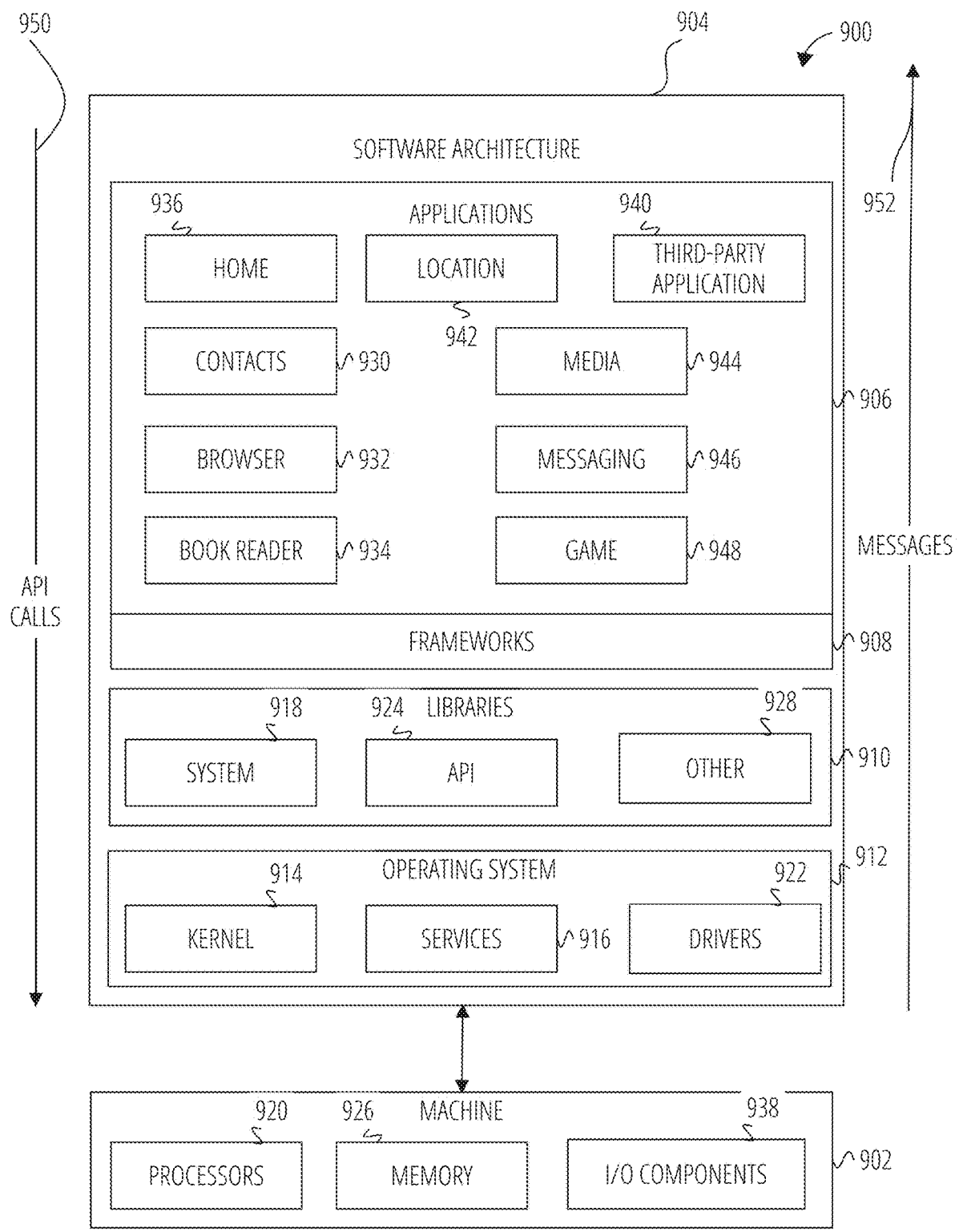
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    receiving, from a first device, an indication of user input selecting to determine zoning metrics for a webpage based on a selected device type;
    accessing, in response to receiving the user input, plural session replays corresponding to different visitor sessions by at least one second device with respect to the webpage;
    selecting, from among the plural session replays, a session replay based at least in part on maximizing scroll amount associated with the session replay;
    selecting, from among plural available snapshots corresponding to the selected session replay, a snapshot based at least in part on minimizing display of additional elements on the webpage;
    automatically identifying, based on traversing a tree diagram corresponding to the selected snapshot, zones for webpage;
    determining, based on automatically identifying the zones, zoning metrics for display on the first device,
    wherein determining the zoning metrics is performed in association with an analysis context for the webpage;
    determining that an initial subset of the plural session replays does not include a session replay that matches the analysis context for the webpage based on maximizing the scroll amount;
    expanding, based on the determining, a scroll range for the plural session replays beyond the initial subset; and
    selecting the session replay based on the expanded scroll range.

2. The method of claim 1, wherein selecting the session replay is further based on the selected device type.

3. The method of claim 1, wherein selecting the snapshot is further based on maximizing scroll amount associated with the snapshot.

4. The method of claim 1, wherein the additional elements on the webpage comprise at least one of a menu or a pop-up element.

5. A method, comprising:
    receiving, from a first device, an indication of user input selecting to determine zoning metrics for a webpage based on a selected device type;
    accessing, in response to receiving the user input, plural session replays corresponding to different visitor sessions by at least one second device with respect to the webpage;
    selecting, from among the plural session replays, a session replay based at least in part on maximizing scroll amount associated with the session replay;
    selecting, from among plural available snapshots corresponding to the selected session replay, a snapshot based at least in part on minimizing display of additional elements on the webpage;
    automatically identifying, based on traversing a tree diagram corresponding to the selected snapshot, zones for webpage;
    determining, based on automatically identifying the zones, zoning metrics for display on the first device,
    wherein determining the zoning metrics is performed in association with an analysis context for the webpage;
    determining that an initial subset of the plural session replays does not include a session replay that matches the analysis context for the webpage based on maximizing the scroll amount;
    expanding, based on the determining, a time period range for the plural session replays beyond the initial subset; and
    selecting the session replay based on the expanded time period range.

6. A system comprising:
    at least one processor; and
    a memory storing instructions that, when executed by the at least one processor, configure the at least one processor to perform operations comprising:
    receiving, from a first device, an indication of user input selecting to determine zoning metrics for a webpage based on a selected device type;

accessing, in response to receiving the user input, plural session replays corresponding to different visitor sessions by at least one second device with respect to the webpage;

selecting, from among the plural session replays, a session replay based at least in part on maximizing scroll amount associated with the session replay;

selecting, from among plural available snapshots corresponding to the selected session replay, a snapshot based at least in part on minimizing display of additional elements on the webpage;

automatically identifying, based on traversing a tree diagram corresponding to the selected snapshot, zones for webpage;

determining, based on automatically identifying the zones, zoning metrics for display on the first device, wherein determining the zoning metrics is performed in association with an analysis context for the webpage;

determining that an initial subset of the plural session replays does not include a session replay that matches the analysis context for the webpage based on maximizing the scroll amount;

expanding, based on the determining, a scroll range for the plural session replays beyond the initial subset; and selecting the session replay based on the expanded scroll range.

7. The system of claim 6, wherein selecting the session replay is further based on the selected device type.

8. The system of claim 6, wherein selecting the snapshot is further based on maximizing scroll amount associated with the snapshot.

9. The system of claim 6, wherein the additional elements on the webpage comprise at least one of a menu or a pop-up element.

10. A system comprising:
   at least one processor; and
   a memory storing instructions that, when executed by the at least one processor, configure the at least one processor to perform operations comprising:
   receiving, from a first device, an indication of user input selecting to determine zoning metrics for a webpage based on a selected device type;
   accessing, in response to receiving the user input, plural session replays corresponding to different visitor sessions by at least one second device with respect to the webpage;
   selecting, from among the plural session replays, a session replay based at least in part on maximizing scroll amount associated with the session replay;
   selecting, from among plural available snapshots corresponding to the selected session replay, a snapshot based at least in part on minimizing display of additional elements on the webpage;
   automatically identifying, based on traversing a tree diagram corresponding to the selected snapshot, zones for webpage;
   determining, based on automatically identifying the zones, zoning metrics for display on the first device,
   wherein determining the zoning metrics is performed in association with an analysis context for the webpage;
   determining that an initial subset of the plural session replays does not include a session replay that matches the analysis context for the webpage based on maximizing the scroll amount;
   expanding, based on the determining, a time period range for the plural session replays beyond the initial subset; and
   selecting the session replay based on the expanded time period range.

11. A non-transitory computer-readable storage medium, the computer-readable storage medium including instructions that when executed by a computer, cause the computer to perform operations comprising:
   receiving, from a first device, an indication of user input selecting to determine zoning metrics for a webpage based on a selected device type;
   accessing, in response to receiving the user input, plural session replays corresponding to different visitor sessions by at least one second device with respect to the webpage;
   selecting, from among the plural session replays, a session replay based at least in part on maximizing scroll amount associated with the session replay;
   selecting, from among plural available snapshots corresponding to the selected session replay, a snapshot based at least in part on minimizing display of additional elements on the webpage;
   automatically identifying, based on traversing a tree diagram corresponding to the selected snapshot, zones for webpage;
   determining, based on automatically identifying the zones, zoning metrics for display on the first device,
   wherein determining the zoning metrics is performed in association with an analysis context for the webpage;
   determining that an initial subset of the plural session replays does not include a session replay that matches the analysis context for the webpage based on maximizing the scroll amount;
   expanding, based on the determining, a scroll range for the plural session replays beyond the initial subset; and
   selecting the session replay based on the expanded scroll range.

12. The non-transitory computer-readable storage medium of claim 11, wherein selecting the session replay is further based on the selected device type.

13. The non-transitory computer-readable storage medium of claim 11, wherein selecting the snapshot is further based on maximizing scroll amount associated with the snapshot.

* * * * *